(12) United States Patent
Lee

(10) Patent No.: US 12,548,602 B2
(45) Date of Patent: Feb. 10, 2026

(54) MEMORY DEVICE AND MANUFACTURING METHOD OF THE MEMORY DEVICE

(71) Applicant: SK hynix Inc., Icheon-si (KR)

(72) Inventor: Nam Jae Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 142 days.

(21) Appl. No.: 18/401,945

(22) Filed: Jan. 2, 2024

(65) Prior Publication Data

US 2025/0037743 A1 Jan. 30, 2025

(30) Foreign Application Priority Data

Jul. 26, 2023 (KR) ........................ 10-2023-0097344

(51) Int. Cl.
| | |
|---|---|
| *G11C 5/06* | (2006.01) |
| *H10B 41/20* | (2023.01) |
| *H10B 41/40* | (2023.01) |
| *H10B 43/20* | (2023.01) |
| *H10B 43/40* | (2023.01) |

(52) U.S. Cl.
CPC ............ *G11C 5/063* (2013.01); *H10B 41/20* (2023.02); *H10B 41/40* (2023.02); *H10B 43/20* (2023.02); *H10B 43/40* (2023.02)

(58) Field of Classification Search
CPC ........ G11C 5/063; H10B 41/20; H10B 41/40; H10B 43/20; H10B 43/40; H10B 43/27; H10B 43/50; H10B 41/41; H10B 41/35; H10B 43/35; H10B 41/50; H01L 23/5283; H01L 24/08; H01L 2224/08059; H01L 2224/0812
USPC .......................................................... 365/63
See application file for complete search history.

(56) References Cited

U.S. PATENT DOCUMENTS

| | | | | |
|---|---|---|---|---|
| 6,881,656 | B1 * | 4/2005 | Isobe | .................. H01L 21/3212 |
| | | | | 438/692 |
| 2023/0141447 | A1 * | 5/2023 | Lee | ..................... H01L 25/0652 |
| | | | | 257/782 |
| 2023/0361066 | A1 * | 11/2023 | Chen | ....................... H01L 25/18 |
| 2023/0378110 | A1 * | 11/2023 | Kim | ........................ H01L 24/05 |

FOREIGN PATENT DOCUMENTS

| | | | | |
|---|---|---|---|---|
| CN | 113228234 A | * | 8/2021 | ............. H01L 24/73 |
| KR | 1020180068423 A | | 6/2018 | |
| KR | 1020200094529 A | | 8/2020 | |

\* cited by examiner

*Primary Examiner* — Fernando Hidalgo

(74) *Attorney, Agent, or Firm* — WILLIAM PARK AND ASSOCIATES LTD.

(57) ABSTRACT

A memory device, and a method of manufacturing the memory device, includes a lower structure including a first pad exposed through a top surface of the lower structure. The memory device also includes an upper structure including a second pad exposed through a bottom surface of the upper structure. The first and second pads are bonded to each other, and an interface at which the first and second pads are bonded to each other forms a curved surface.

20 Claims, 16 Drawing Sheets

MEMORY DEVICE AND MANUFACTURING METHOD OF THE MEMORY DEVICE

CROSS-REFERENCE TO RELATED APPLICATION

The present application claims priority under 35 U.S.C. § 119(a) to Korean patent application number 10-2023-0097344 filed on Jul. 26, 2023, in the Korean Intellectual Property Office, the entire disclosure of which is incorporated by reference herein.

BACKGROUND

1. Technical Field

The present disclosure generally relates to a memory device and a manufacturing method of the memory device, and more particularly, to a memory device manufactured by a wafer bonding manufacturing method and a manufacturing method of the memory device.

2. Related Art

A memory device may include a memory cell array in which data is stored and a peripheral circuit configured to perform a program, read, or erase operation of the memory cell array.

The memory cell array may include a plurality of memory blocks, and the plurality of memory blocks may include a plurality of memory cells stacked in a vertical direction from a substrate.

As the number of memory cells included in the memory cell array increases to increase a data storage capacity of the memory device, the size of the memory device may increase. To reduce the size of the memory device, the peripheral circuit and the memory cell array may be formed on different substrates. Then, the peripheral circuit and the memory cell array, which are formed on the different substrates, may be bonded to each other.

Pads may be used, which allow a lower structure including the peripheral circuit and an upper structure including the memory cell array to be bonded to each other and allow the lower structure and the upper structure to be electrically connected to each other. For example, lower pads exposed to a top surface of the lower structure and upper pads exposed to a bottom surface of the upper structure may be bonded to each other. When a contact failure occurs at a bonding surface between the lower pads and the upper pad or when the area of the bonding surface decreases, resistance between the lower pads and the upper pads may increase.

SUMMARY

In accordance with an embodiment of the present disclosure, a memory device includes: a lower structure including a first pad exposed through a top surface of the lower structure; and an upper structure including a second pad exposed through a bottom surface of the upper structure, wherein the first and second pads are bonded to each other, and wherein an interface at which the first and second pads are bonded to each other forms a curved surface.

In accordance with another embodiment of the present disclosure, a method of manufacturing a memory device includes: forming a first peripheral layer on a first substrate; forming a first opening in the first peripheral layer; forming a first conductive layer for a first pad on the first opening and the first peripheral layer; performing a first planarization process on the first conductive layer until the first peripheral layer is exposed, using a first slurry with the first conductive layer as a target; forming a second conductive pattern for a second pad on a second substrate; forming a second peripheral layer on the second pad and the second substrate; performing a second planarization process on the second peripheral layer until the second conductive pattern is exposed, using a second slurry with the second peripheral layer as a target; and overturning the second substrate such that the second conductive pattern is located on a bottom surface of the second substrate, and allowing the second conductive pattern to be bonded to the first conductive layer.

In accordance with another embodiment of the present disclosure, a memory device includes a first structure including a peripheral circuit on a substrate with at least one exposed first pad embedded into the peripheral circuit opposite to the substrate. The memory device also includes a second structure including a memory cell array with at least one exposed second pad embedded into the memory cell array. Exposed surfaces of the at least one first pad and the at least one second pad have opposite curvatures that mate together such that the first and second structures are joined by the at least one first pad being bonded to the at least one second pad.

BRIEF DESCRIPTION OF THE DRAWINGS

Example embodiments will now be described more fully hereinafter with reference to the accompanying drawings; however, they may be embodied in different forms and should not be construed as being limited to the embodiments set forth herein. Rather, these embodiments are provided so that this disclosure will be enabling to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The specific structural and functional descriptions disclosed herein are merely illustrative for the purpose of describing embodiments according to the concept of the present disclosure. Additional embodiments according to the concept of the present disclosure can be implemented in various forms. Thus, the present disclosure should not be construed as limited to the embodiments set forth herein.

Hereinafter, it will be understood that, although the terms "first," "second," etc. may be used herein to describe various elements, these elements should not be limited by these terms. These terms are only used to distinguish one element from another element and not to imply a number or order of elements.

Some embodiments provide a memory device and a manufacturing method of the memory device, which can improve a bonding process of the memory device.

Figure 1A:
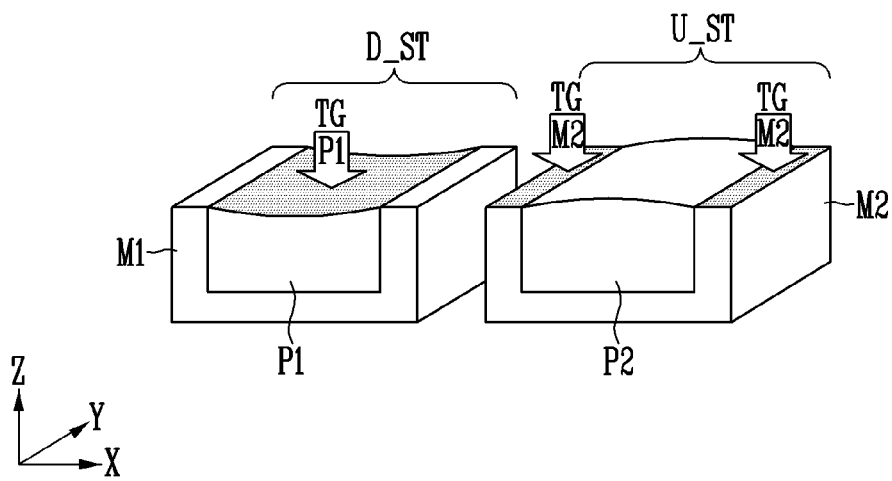
FIGS. 1A and 1B are views illustrating a manufacturing method of a memory device in accordance with the present disclosure.
Figure 1B:
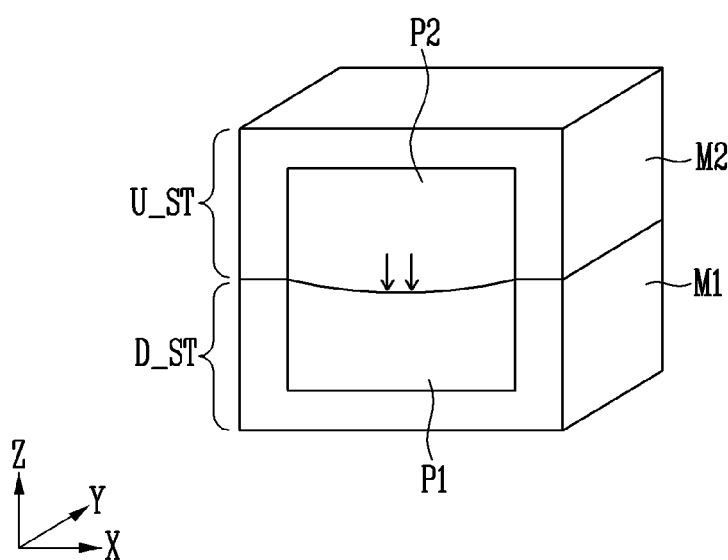

FIGS. 1A and 1B are views illustrating a manufacturing method of a memory device in accordance with the present disclosure.

Referring to FIG. 1A, a lower structure D_ST and an upper structure U_ST of the memory device may include first and second pads P1 and P2 formed in different manners on different substrates. The substrate may be a silicon substrate. The first pad P1 may be included in the lower structure D_ST, and be surrounded by a first material layer M1. The first pad P1 may be formed of a material different from a material of the first material layer M1. The second pad P2 may be included in the upper structure U_ST, and be surrounded by a second material layer M2. The second pad P2 may be formed of a material different from a material of the second material layer M2.

When the first pad P1 is formed in the lower structure D_ST, a first planarization process may be performed such that a top surface of the first pad P1 is formed concave. The first planarization process may be a chemical mechanical polishing process. A first slurry using the first pad P1 as a target TG may be used in the first planarization process. When the first slurry using the first pad P1 as the target TG is coated on a top surface of the lower structure D_ST and then polished, a portion of the first pad P1 may be further polished even though the first material layer M1 is exposed.

Therefore, by the first planarization process, the top surface of the first pad P1 may have a shape more concave than a top surface of the first material layer M1.

When the second pad P2 is formed in the upper structure U_ST, a second planarization process different from the first planarization process may be performed such that a top surface of the second pad P2 is formed convex. The second planarization process may be a chemical mechanical polishing process. A second slurry using, as a target TG, the second material layer M2 instead of the second pad P2 may be used in the second planarization process. When the second slurry using the second material layer M2 as the target TG is coated on the upper structure U_ST and then polished, a portion of the second material layer M2 may be further polished even though the second pad P2 is exposed. Therefore, by the second planarization process, the top surface of the second pad P2 may have a shape more convex than a top surface of the second material layer M2.

Referring to FIG. 1B, when the upper structure U_ST is overturned, and the overturned upper structure U_ST is disposed on the top of the lower structure D_ST, the first pad P1 and the second pad P2 may be bonded to each other. The first and second pads P1 and P2 may be formed of the same material, and the first and second material layers M1 and M2 may be formed of the same material. Because a surface of the first pad P1 has a concave curved surface, and a surface of the second pad P2 has a convex curved surface, the area of a bonding surface of the first and second pads P1 and P2 may increase when the lower structure D_ST and the upper structure U_ST are bonded to each other. Therefore, a bonding force between the first and second pads P1 and P2 may be increased. In addition, because the concave curved surface and the convex curved surface are bonded to each other, misalignment of the lower structure D_ST and the upper structure U_ST may be reduced.

When the above-described manufacturing method is applied to a wafer bonding technique, the bonding force between the lower structure and the upper structure, which are manufactured on different substrates, can be increased.

Figure 2:
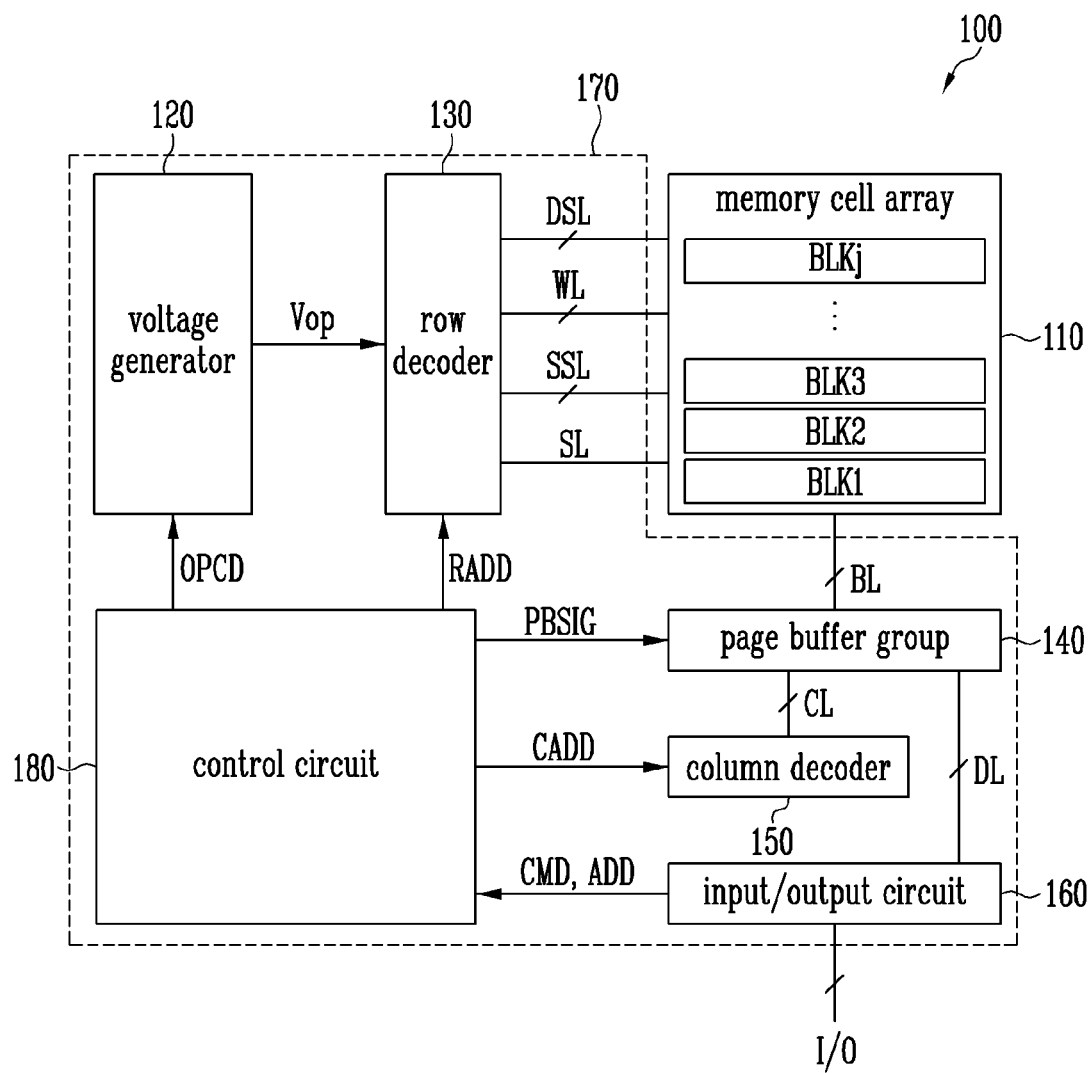
FIG. 2 is a diagram illustrating a memory device.

FIG. 2 is a diagram illustrating a memory device.

Referring to FIG. 2, the memory device 100 may include a memory cell array 110 and a peripheral circuit 170.

The memory cell array 110 may include first to jth memory blocks BLK1 to BLKj. Each of the first to jth memory blocks BLK1 to BLKj may include memory cells capable of storing data. Drain select lines DSL, word lines WL, source select lines SSL, and a source line SL may be connected to each of the first to jth memory blocks BLK1 to BLKj, and bit lines BL may be commonly connected to the first to jth memory blocks BLK1 to BLKj.

The first to jth memory blocks BLK1 to BLKj may be formed in a two-dimensional structure or a three-dimensional structure. Memory blocks having a two-dimensional structure may include memory cells arranged parallel to a substrate. Memory blocks having a three-dimensional structure may include memory cells stacked in a vertical direction above a substrate. In this embodiment, memory blocks formed in a three-dimensional structure are disclosed.

The memory cells may store one-bit or two-or-more-bit data according to a program method. For example, a method in which one-bit data is stored in one memory cell is referred to as a single-level cell method, and a method in which two-bit data is stored in one memory cell is referred to as a multi-level cell method. A method in which three-bit data is stored in one memory cell is referred to as a triple-level cell method, and a method in which four-bit data is stored in one memory cell is referred to as a quad-level cell method. In addition, five-or-more-bit data may be stored in one memory cell.

The peripheral circuit 170 may be configured to perform a program operation for storing data, a read operation for outputting data stored in the memory cell array 110, and an erase operation for erasing data stored in the memory cell array 110. For example, the peripheral circuit 170 may include a voltage generator 120, a row decoder 130, a page buffer group 140, a column decoder 150, an input/output circuit 160, and a control circuit 180.

The voltage generator 120 may generate various operating voltages Vop used for a program operation, a read operation, or an erase operation in response to an operation code OPCD. For example, the voltage generator 120 is configured to generate program voltages, turn-on voltages, turn-off voltages, negative voltages, precharge voltages, verify voltages, read voltages, pass voltages, and erase voltages in response to the operation code OPCD. The operating voltages Vop generated by the voltage generator 120 may be applied to drain select lines DSL, word lines WL, source select lines SSL, and a source line SL of a selected memory block through the row decoder 130.

The program voltages are voltages applied to a selected word line among word lines WL in a program operation, and may be used to increase a threshold voltage of memory cells connected to the selected word line. The turn-on voltages may be applied to the drain select lines DSL or the source select lines SSL, and be used to turn on drain select transistors or source select transistors. The turn-off voltages may be applied to the drain select lines DSL or the source select lines SSL, and be used to turn off the drain select transistors or the source select transistors. For example, the turn-off voltages may be set to 0V. The precharge voltages are voltages higher than 0V, and they may be applied to the bit lines in a read operation. The verify voltages may be used in a verify operation for determining whether a threshold voltage of selected memory cells has been increased or decreased to a target level. The verify voltages may be set to various levels according to the target level, and they may be applied to a selected word line.

The read voltages may be applied to a selected word line in a read operation of selected memory cells. For example, the read voltages may be set to various levels according to a program method of the selected memory cells. The pass voltages are voltages applied to unselected word lines among the word lines WL in a program or read operation, and they may be used to turn on memory cells connected to the unselected word lines.

The erase voltages may be used in an erase operation for erasing memory cells included in a selected memory block, and be applied to the source line SL.

The row decoder 130 may be configured to transmit the operating voltages Vop to drain select lines DSL, word lines WL, source select lines SSL, and a source line SL, which are connected to a selected memory block, according to a row address RADD. For example, the row decoder 130 may be connected to the voltage generator 120 through global lines, and may be connected to the first to jth memory blocks BLK1 to BLKj through the drain select lines DSL, the word lines WL, the source select lines SSL, and the source line SL.

The page buffer group 140 may include page buffers (not shown) respectively connected to the first to jth memory blocks BLK1 to BLKj. Each of the page buffers (not shown) may be connected to the first to jth memory blocks BLK1 to BLKj through the bit lines BL. In a read operation, the page buffers (not shown) may sense a current or a voltage of the bit lines, which vary according to threshold voltages of the selected memory cells, in response to page buffer control signals PBSIG, and temporarily store sensed data.

The column decoder 150 may be configured to transmit data between the page buffer group 140 and the input/output circuit 160 in response to a column address CADD. For example, the column decoder 150 may be connected to the page buffer group 140 through column lines CL, and it may transmit enable signals through the column lines. The page buffers (not shown) included in the page buffer group 140 may receive or output data through data lines DL in response to the enable signals.

The input/output circuit 160 may be configured to receive or output a command CMD, an address ADD, or data through input/output lines I/O. For example, the input/output circuit 160 may transmit, to the control circuit 180, a command CMD and an address ADD, which are received from an external controller, through the input/output lines I/O, and it may transmit data received from the external controller to the page buffer group 140 through the input/output lines I/O. Alternatively, the input/output circuit 160 may output data transferred from the page buffer group 140 to the external controller through the input/output lines I/O.

The control circuit 180 may output an operation codes OPCD, the row address RADD, the page buffer control signals PBSIG, and the column address CADD in response to the command CMD and the address ADD. For example, when the command CMD input to the control circuit 180 is a command corresponding to a program operation, the control circuit 180 may control devices included in the peripheral circuit 170 to perform a program operation of a memory block selected by the address ADD. When the command CMD input to the control circuit 180 is a command corresponding to a read operation, the control circuit 180 may control devices included in the peripheral circuit 170 to perform the read operation of the selected memory block and output read data. When the command CMD input to the control circuit 180 is a command corresponding to an erase operation, the control circuit 180 may control devices included in the peripheral circuit 170 to perform the erase operation of the selected memory block.

Figure 3:
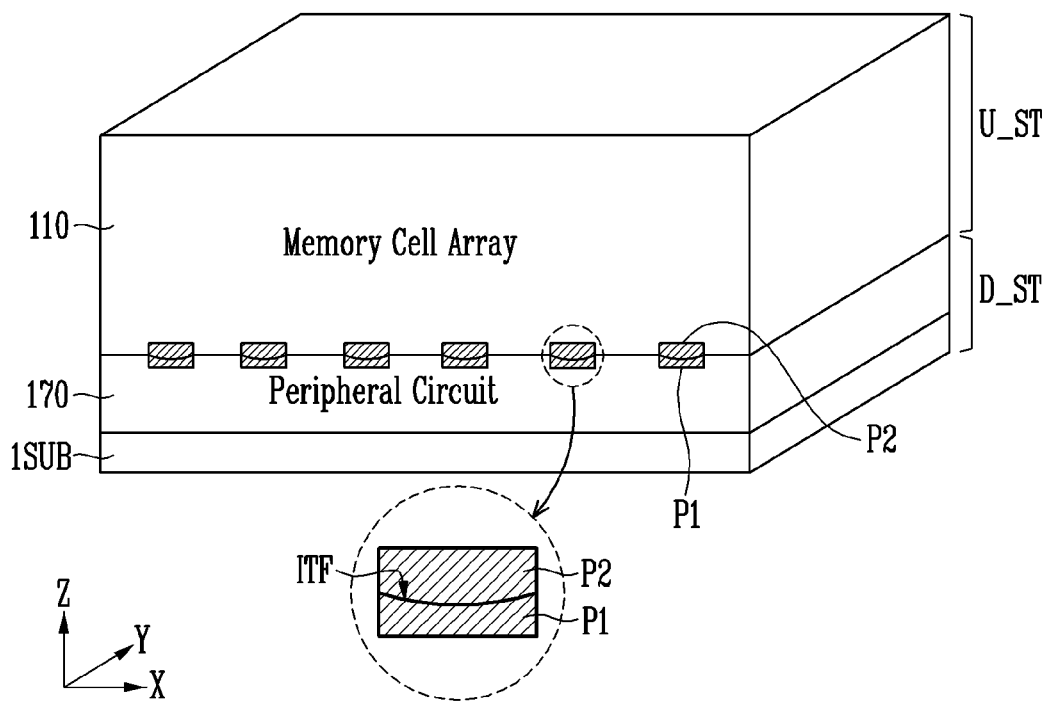
FIG. 3 is a view illustrating a memory device in which a lower structure and an upper structure are bonded to each other in accordance with an embodiment of the present disclosure.

FIG. 3 is a view illustrating a memory device in which a lower structure and an upper structure are bonded to each other in accordance with an embodiment of the present disclosure.

Referring to FIG. 3, the memory device may include a lower structure D_ST and an upper structure U_ST, which are stacked. The lower structure D_ST may include a first substrate 1SUB, a peripheral circuit 170, and first pads P1. The upper structure U_ST may include a memory cell array 110 and second pads P2. The first pads P1 may be in contact with contacts of the peripheral circuit 170, and they may be formed of a conductive material. The second pads P2 may be in contact with contacts of the memory cell array 110, and they may be formed of a conductive material.

The first pads P1 and the second pads P2 may be bonded to each other, and each of interfaces ITF at which the first pads P1 and the second pads P2 are bonded to each other may form a curved surface. For example, an interface ITF of each of the first pads P1 bonded to the second pads P2 may be concave, and an interface ITF of each of the second pads P2 bonded to the first pads P1 may be convex. Alternatively, each of the first pads P1 bonded to the second pads P2 may be convex, and an interface ITF of each of the second pads P2 bonded to the first pads P1 may be concave. When each of the interfaces ITF at which the first pads P1 and the second pads P2 may be bonded to each other form a curved surface, a bonding area of the first and second pads P1 and P2 may increase as compared with a case where the interface ITF forms a flat surface. Therefore, the strength of the bond is stronger between the first and second pads P1 and P2. Thus, a bonding force or strength between the lower structure D_ST and the upper structure U_ST can be increased, and misalignment of the lower structure D_ST and the upper structure U_ST can be reduced.

In this embodiment, different planarization processes may be performed on the lower structure D_ST and the upper structure U_ST such that a surface of each of the first pads P1 and a surface of each of the second pads P2 have different curved surfaces. The different planarization processes are described with reference to FIGS. 4A and 4B.

FIGS. 4A to 4D are views illustrating a manufacturing method of a memory device in accordance with a first embodiment of the present disclosure.

Figure 4A:
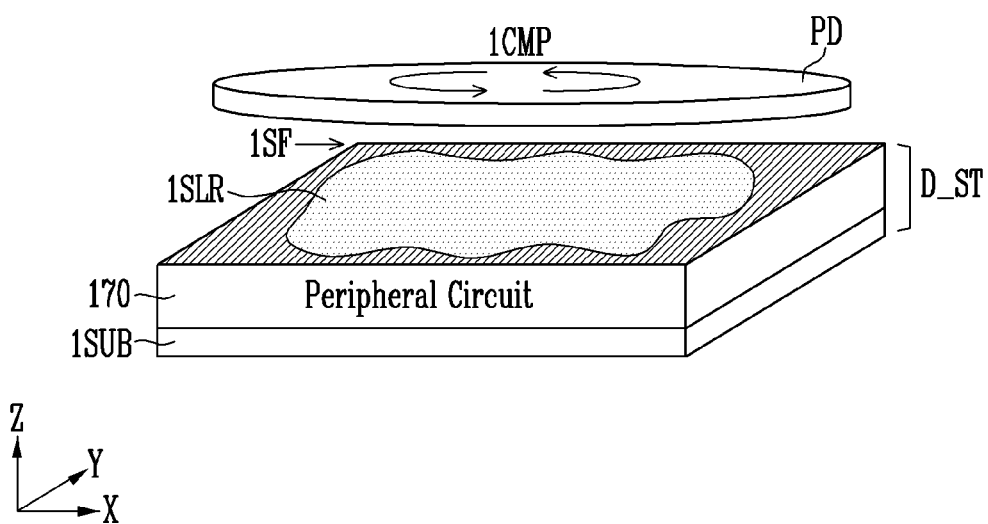
FIGS. 4A to 4D are views illustrating a manufacturing method of a memory device in accordance with a first embodiment of the present disclosure.

Referring to FIG. 4A, a lower structure D_ST may include a first substrate 1SUB and a peripheral circuit 170 stacked on the first substrate 1SUB. The peripheral circuit 170 may include a plurality of transistors, conductive lines, and contacts. A peripheral layer covering first pads may be exposed to a first surface 1SF as an uppermost surface of the peripheral circuit 170. For example, the peripheral layer may be filled between the first pads. The peripheral layer covering the tops of the first pads may be exposed through the first surface 1SF until before a first planarization process 1CMP is performed. The first pads and the peripheral layer may be formed of different materials.

The first planarization process 1CMP is a chemical mechanical polishing process, and may be performed using a first slurry 1SLR for chemical polishing and a polishing pad PD for mechanical polishing. For example, the first slurry 1SLR may be uniformly coated on the lower structure D_ST, and a constant pressure may be applied to the lower structure D_ST, using the rotating polishing pad PD.

The first planarization process 1CMP may be performed until the first pads located on the bottom of the peripheral layer are exposed. For a surface of each of the first pads to be formed concave, the first slurry 1SLR used in the first planarization process 1CMP may be made of a component using the first pads as a target. The first slurry 1SLR using the first pads as the target may be a polishing solution having a polishing speed of the first pads, which is faster than a polishing speed of the peripheral layer. Therefore, when the first pads are exposed while the peripheral layer is polished, polishing may be temporally performed on each of the first pads until before the first planarization process 1CMP is ended, and a top surface of each of the first pads may be temporally polished faster than the peripheral layer by the first slurry 1SLR. Because the polishing can be performed faster as an area exposed to the first slurry 1SLR becomes wider, a central portion of each of the first pads is polished further than edges of each of the first pads, and therefore, the top surface of each of the first pads may become concave.

Figure 4B:
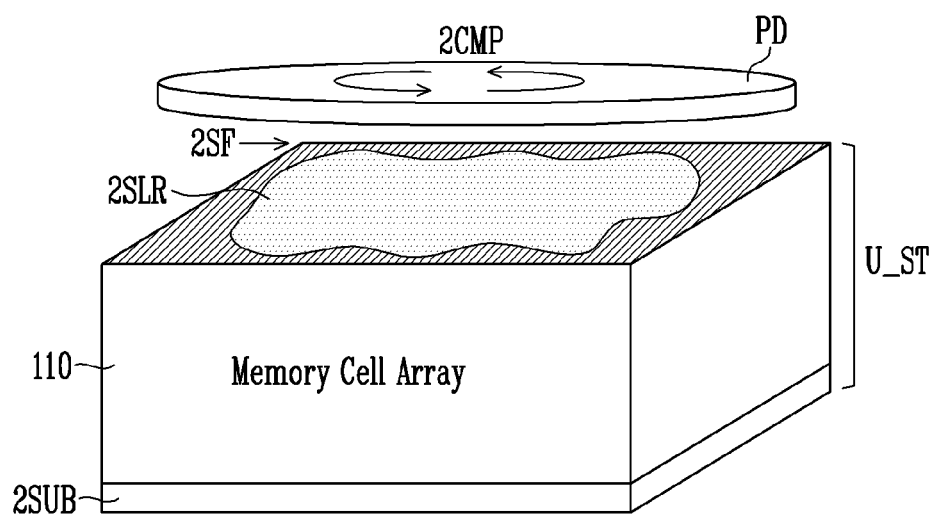
Figure 4B:
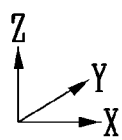

Referring to FIG. 4B, an upper structure U_ST may include a second substrate 2SUB and a memory cell array 110 stacked on the second substrate 2SUB. The memory cell array 110 may include a plurality of memory blocks, and each of the plurality of memory blocks may include a plurality of cell plugs and contacts in contact with the plurality of cell plugs. Each of the plurality of cell plugs may include a plurality of memory cells and select transistors.

A peripheral layer covering second pads may be exposed to a second surface 2SF as an uppermost surface of the memory cell array 110. For example, the peripheral layer may be filled between the second pads. The peripheral layer covering the tops of the second pads may be exposed through the second surface 2SF until before a second planarization process 2CMP is performed. The second pads and the peripheral layer may be formed of different materials.

The second planarization process 2CMP is a chemical mechanical polishing process, and may be performed using a second slurry 2SLR for chemical polishing and a polishing pad PD for mechanical polishing. For example, the second slurry 2SLR may be uniformly coated on the upper structure U_ST, and a constant pressure may be applied to the upper structure U_ST, using the rotating polishing pad PD.

The second planarization process 2CMP may be performed until the second pads located on the bottom of the peripheral layer are exposed. For a surface of each of the second pads to be formed convex when the second pads are exposed as the peripheral layer is polished, the second slurry 2SLR used in the second planarization process 2CMP may be made of a component using the peripheral layer as a target. The second slurry 2SLR using the peripheral layer as the target may be a polishing solution having a polishing speed of the peripheral layer, which is faster than a polishing speed of the second pads. Therefore, when the second pads are exposed while the peripheral layer is polished, polishing may be further performed on the peripheral layer as compared with the second pads until before the second planarization process 2CMP is ended. Accordingly, edge portions of each of the second pads is polished together with the peripheral layer as compared with a central portion of each of the second pads, and therefore, a top surface of the second pads may become convex.

Figure 4C:
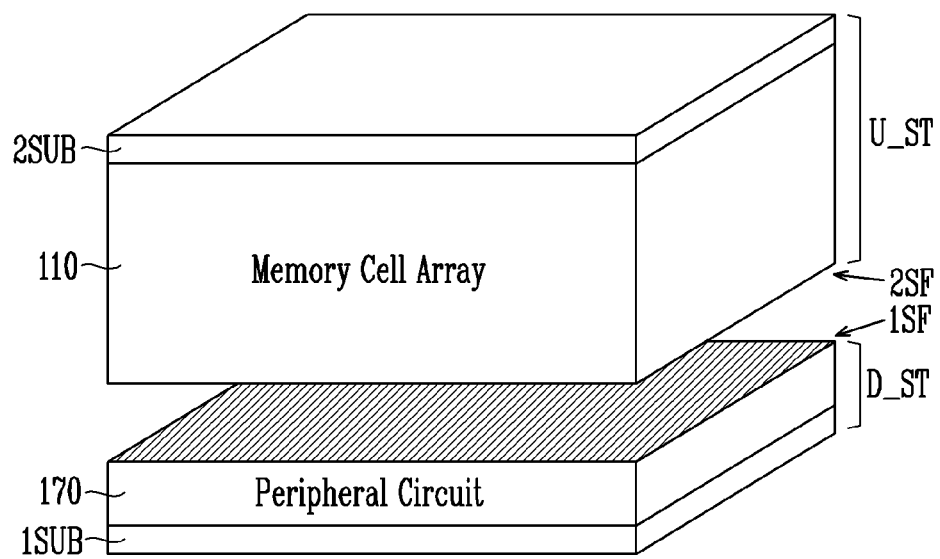
Figure 4C:
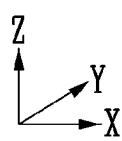

Referring to FIG. 4C, a wafer bonding process may be performed. For example, the upper structure U_ST described with reference to FIG. 4B may be overturned, and the overturned upper structure U_ST may be stacked on the top of the lower structure D_ST described with reference to FIG. 4A. Therefore, the first surface 1SF of the lower structure D_ST and the second surface 2SF of the upper structure U_ST may be bonded to each other.

Figure 4D:
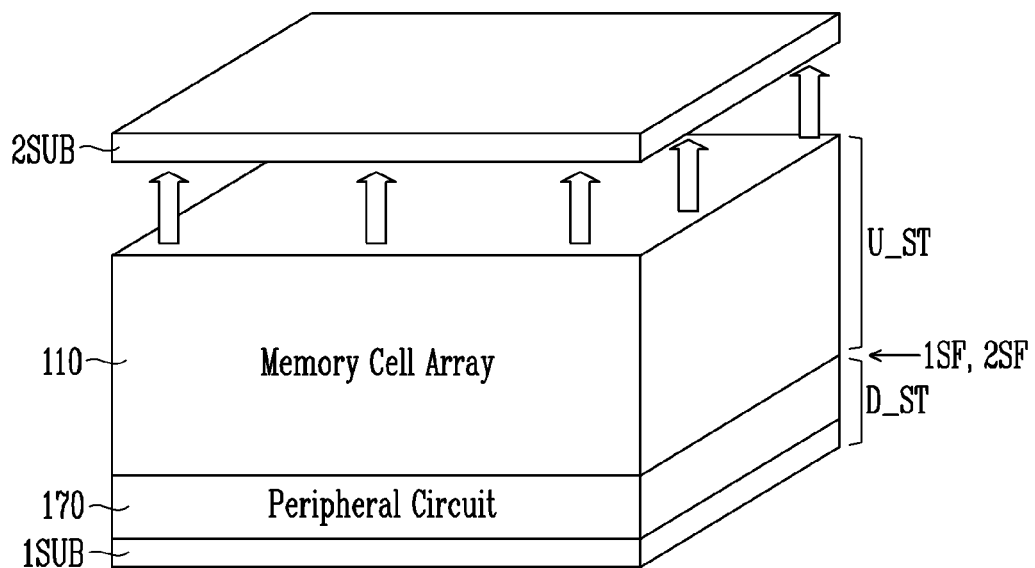

Referring to FIG. 4D, because the first surface 1SF of the lower structure D_ST and the second surface 2SF of the upper structure U_ST are bonded to each other, each of the first pads, which is exposed through the first surface 1SF and has a concave curved surface, and each of the second pads, which is exposed through the second surface 2SF and has a convex curved surface, may be bonded to each other. Because an interface at which the first and second pads are bonded to each other is a curved surface, misalignment of the first and second pads can be prevented. For example, the convex protrusions of the second pads P2 align into the concave pockets of the first pads P1. A bonding force or strength can be increased as the area of the bonded interface is increased. Subsequently, the second substrate 2SUB included in the upper structure U_ST may be removed.

A detailed structure and a manufacturing method of portions at which pads are formed in each of the lower structure D_ST and the upper structure U_ST are described as follows.

FIGS. 5A to 5G are views illustrating a method of manufacturing the lower structure of the memory device in accordance with the first embodiment of the present disclosure.

Figure 5A:
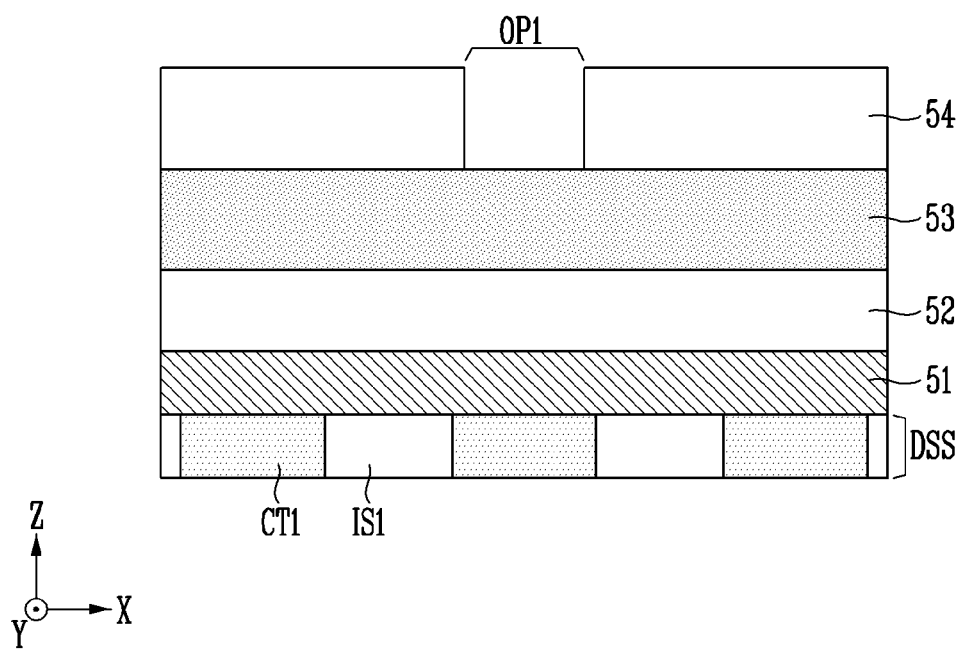
FIGS. 5A to 5G are views illustrating a method of manufacturing a lower structure of the memory device in accordance with the first embodiment of the present disclosure.

Referring to FIG. 5A, a first capping layer 51, a first insulating layer 52, a first blocking layer 53, and a first mask pattern 54 may be sequentially stacked on a lower substructure DSS. The lower sub-structure DSS may be a partial structure included in the lower structure. For example, the lower sub-structure DSS may include at least one first contact CT1 and at least one first contact insulating layer IS1. In addition, although not shown in FIG. 5A, the lower sub-structure DSS may further include a substrate and transistors constituting peripheral circuits.

The first capping layer 51 may be formed of a nitride layer. For example, the nitride layer may be a silicon nitride layer (SiN). The first insulating layer 52 may be formed of an oxide layer. For example, the oxide layer may be a silicon oxide layer ($SiO_2$). The first blocking layer 53 may be formed of a carbon nitride layer. For example, the carbon nitride layer may be a silicon carbon nitride layer (SiCN). The first mask pattern 54 may include a first opening OP1 exposing a portion of the first blocking layer 53. The first opening OP1 may have a circular, elliptical, rectangular, or square layout, and be formed in the form of a hole or a trench according to a length in a Y or X direction or an aspect ratio.

Figure 5B:
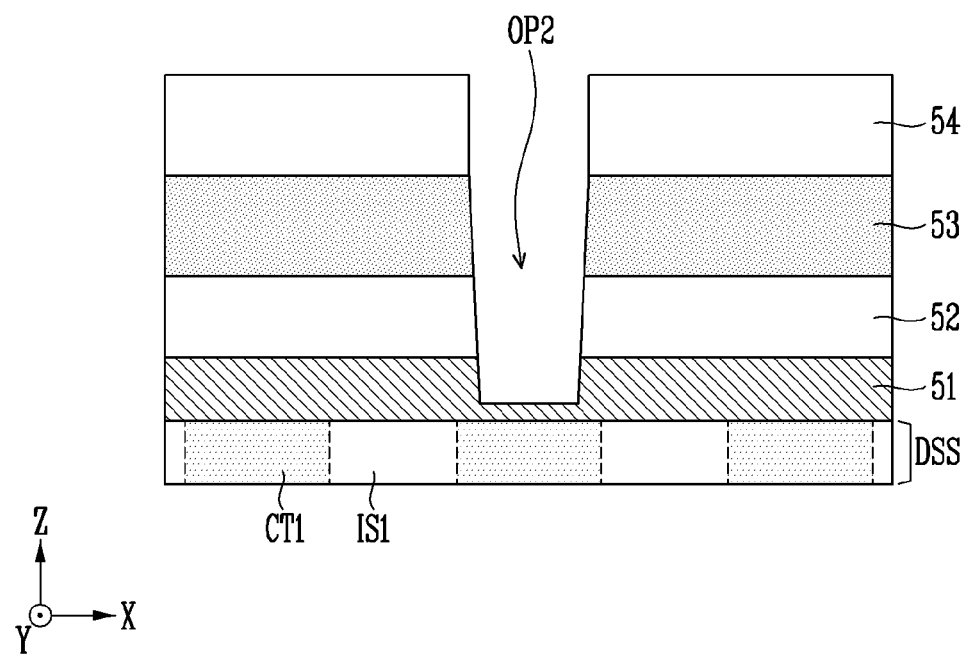

Referring to FIG. 5B, a second opening OP2 may be formed by etching a portion exposed through the first opening (OP1 shown in FIG. 5A) of the first mask pattern 54. The second opening OP2 may have a circular, elliptical, rectangular, or square layout, and be formed in the form of a hole or a trench according to a length in the Y or X direction or an aspect ratio. For example, the second opening OP2 may be formed by sequentially etching the first blocking layer 53, the first insulating layer 52, and the first capping layer 51, which are exposed through the first opening OP1. The second opening OP2 may expose a portion of the first capping layer 51 while penetrating the first blocking layer 53 and the first insulating layer 52. An etching process for forming the second opening OP2 may be performed as an anisotropic dry etching process. In FIG. 5B, it is illustrated that the first capping layer 51 is exposed through a bottom surface of the second opening OP2. However, over-etching may be performed such that the first contact CT1 is exposed.

Figure 5C:
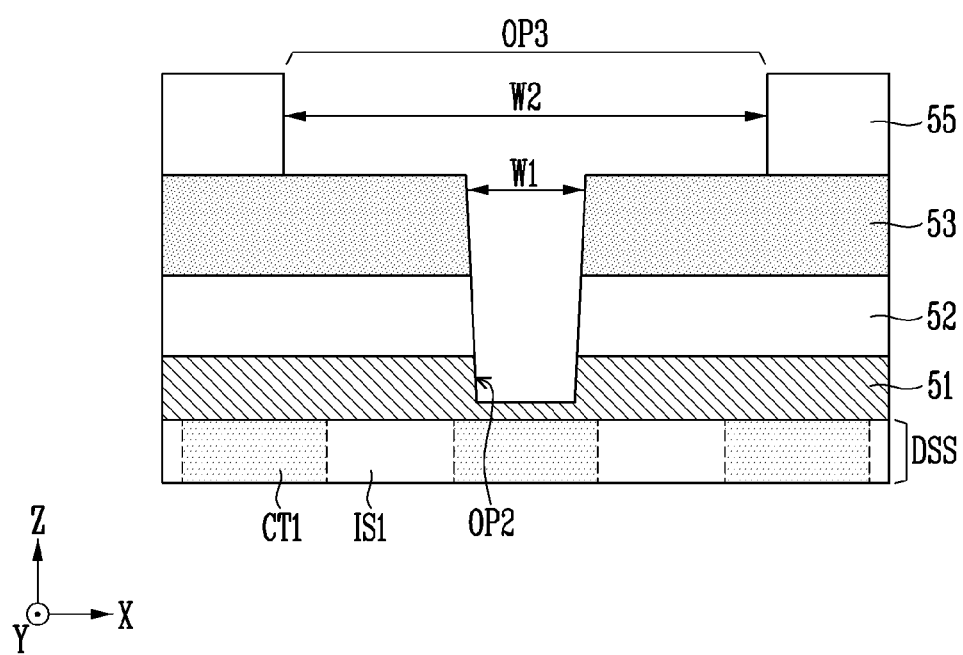

Referring to FIG. 5C, after the second opening OP2 is formed, the first mask pattern 54 may be removed, and a second mask pattern 55 may be formed on the first blocking layer 53. The second mask pattern 55 may include a third opening OP3 having a width wider than a width of the second opening OP2. The third opening OP3 may have a circular, elliptical, rectangular, or square layout, and be formed in the form of a hole or a trench according to a length in the Y or X direction or an aspect ratio. For example, when the second opening OP2 has a first width W1, the third opening OP3 may have a second width W2 wider than the first width W1. Therefore, the second opening OP2 and a portion of the first blocking layer 53 may be exposed through the third opening OP3. Because the second opening OP2 is exposed through the third opening OP3, the first capping layer 51 exposed through the bottom surface of the second opening OP2 may also be exposed through the third opening OP3.

Figure 5D:
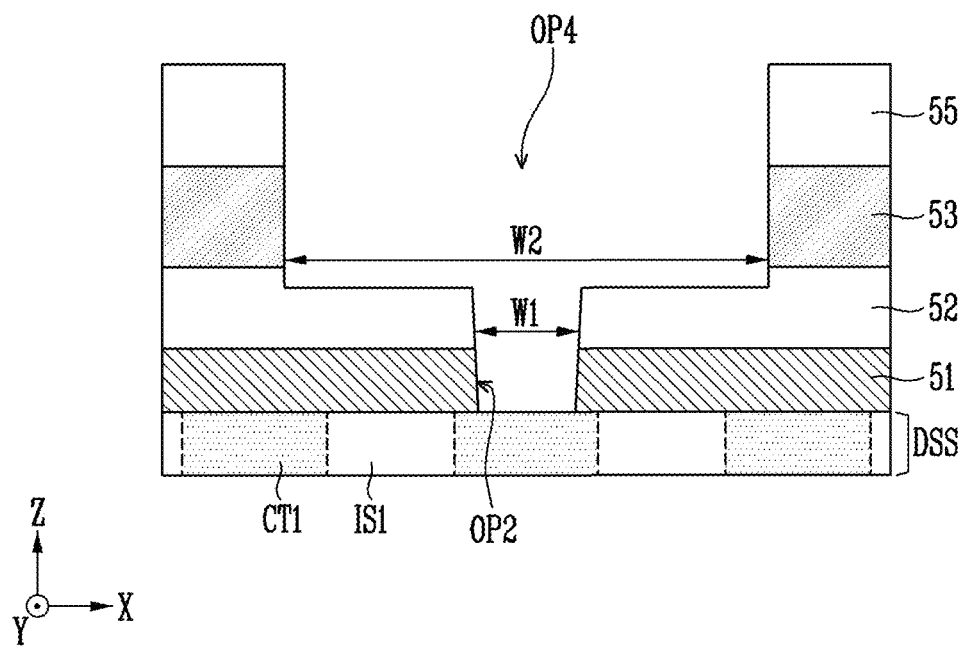

Referring to FIG. 5D, a fourth opening OP4 may be formed by removing the portion of the first blocking layer 53, which is exposed through the second opening (OP2 shown in FIG. 5C), through an etching process. The fourth opening OP4 may have a circular, elliptical, rectangular, or square layout, and be formed in the form of a hole or a trench according to a length in the Y or X direction or an aspect ratio. An anisotropic dry etching process may be performed as the etching process. In the etching process for forming the fourth opening OP4, the portion of the first capping layer 51, which is exposed through the second opening OP2, may also be etched, so that a portion of the first contact CT1 is exposed.

Figure 5E:
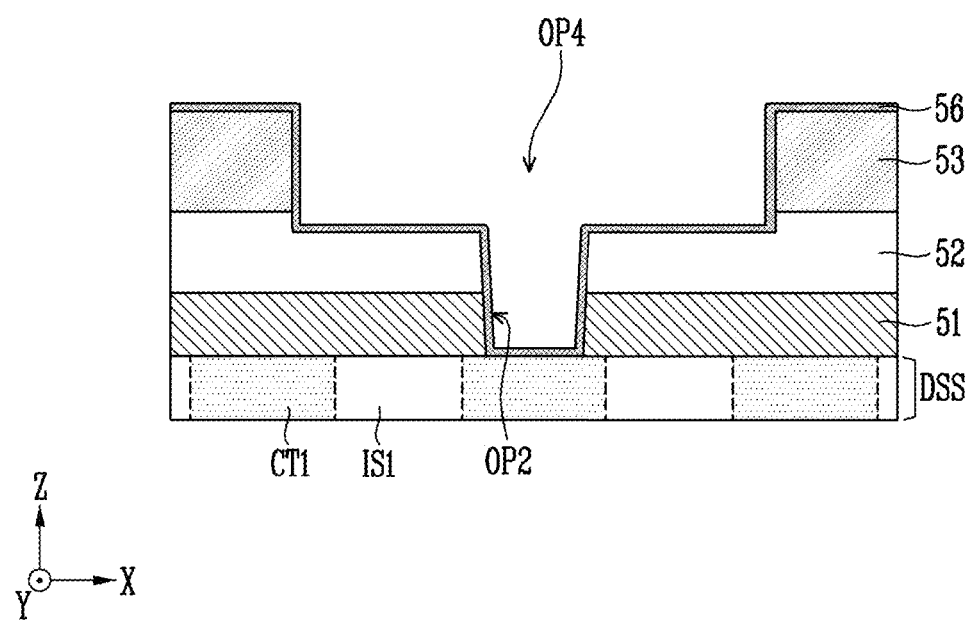

Referring to FIG. 5E, after the fourth opening OP4 is formed, the second mask pattern (55 shown in FIG. 5D) may be removed.

Subsequently, a first barrier layer 56 may be formed along a surface of the entire structure from which the second mask pattern 55 is removed. The first barrier layer 56 is a layer for increasing a bonding force between a conductive layer for a first pad, which is to be formed in a subsequent process, and the layers exposed through the second and fourth openings OP2 and OP4 and preventing diffusion, and a material of the first barrier layer 56 may be determined according to the conductive layer for the first pad.

Figure 5F:
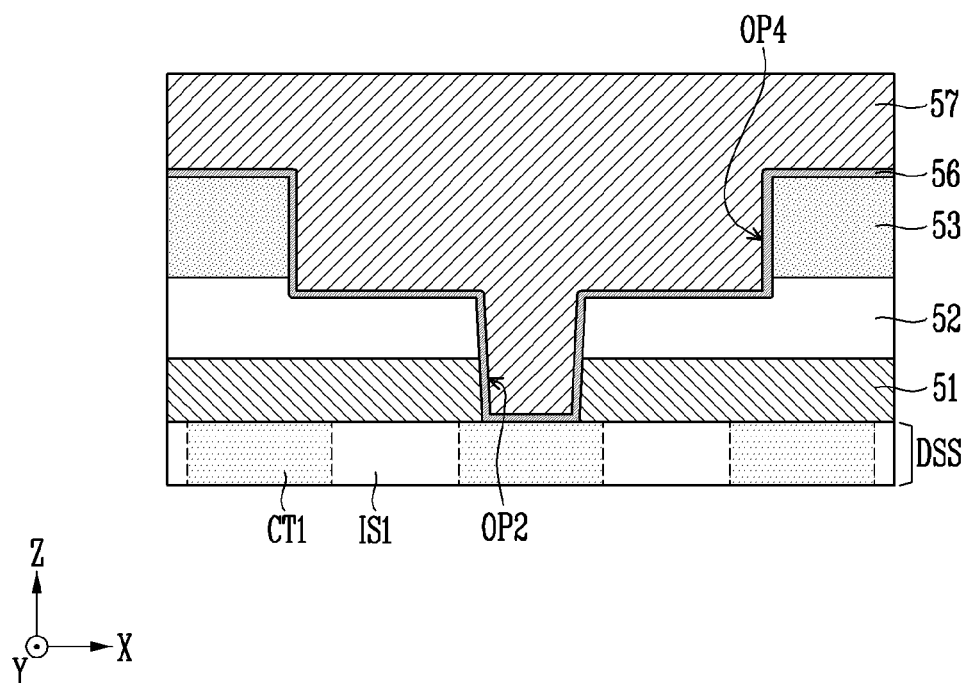

Referring to FIG. 5F, a first conductive layer 57 may be formed on the top of the first barrier layer 56. The first conductive layer 57 may be formed such that the second opening OP2 and the fourth opening OP4 are completely filled therewith. The first conductive layer 57 may be formed of copper (Cu).

Figure 5G:
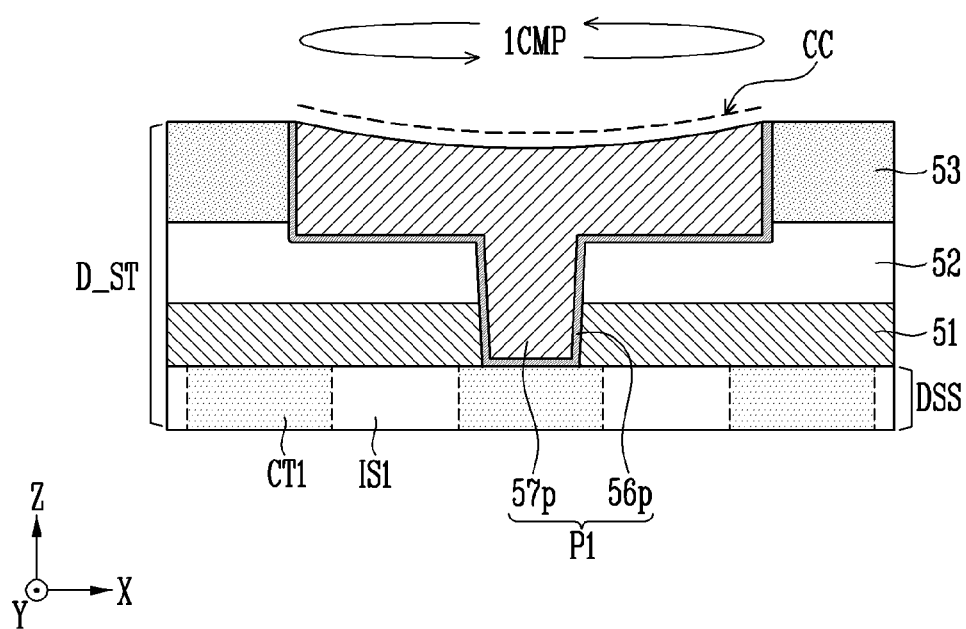

Referring to FIG. 5G, a first planarization process 1CMP may be performed until the first blocking layer 53 is exposed. The first planarization process 1CMP may be performed identically to the first planarization process 1CMP described with reference to FIG. 4A. When the first blocking layer 53 is exposed in the first planarization process 1CMP, portions of the first conductive layer (57 shown in FIG. 5F) and the first barrier layer (56 shown in FIG. 5F), which are formed on the top of the first blocking layer 53, are removed, and therefore, a first conductive pattern 57p and a first barrier pattern 56p may remain in the second and fourth openings OP2 and OP4. The first conductive pattern 57p and the first barrier pattern 56p may become a first pad P1.

Because a first slurry used in the first planarization process 1CMP is made of a component using the first conductive pattern 57p as a target, the first conductive pattern 57p may be over-polished even when the first blocking layer 53 is exposed. Therefore, a top surface of the first conductive pattern 57p may have a concave curved surface CC in a direction toward the lower sub structure DSS. Accordingly, a lower structure D_ST including the first pad P1 may be formed.

FIGS. 6A to 6H are views illustrating a method of manufacturing the upper structure of the memory device in accordance with the first embodiment of the present disclosure.

Figure 6A:
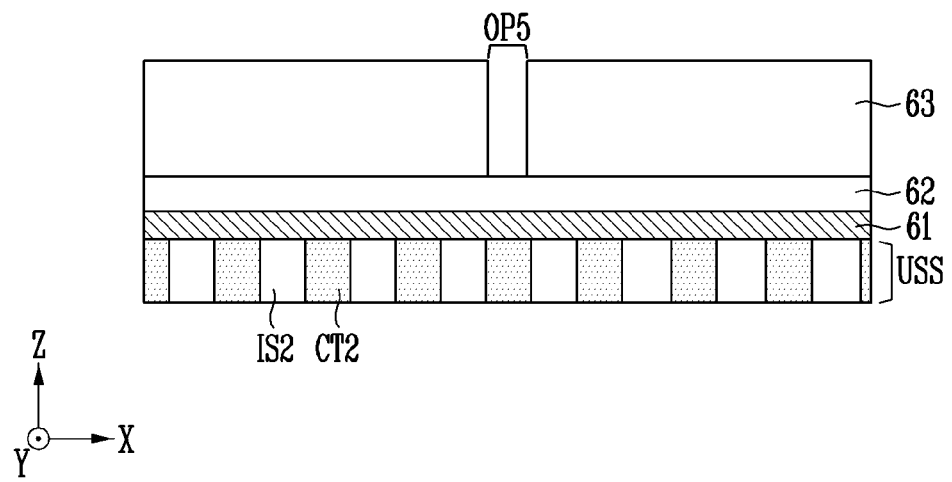
FIGS. 6A to 6H are views illustrating a method of manufacturing an upper structure of the memory device in accordance with the first embodiment of the present disclosure.

Referring to FIG. 6A, a second capping layer 61, a second insulating layer 62, and a third mask pattern 63 may be sequentially stacked on an upper sub-structure USS. The upper sub-structure USS may be a partial structure included in the upper structure. For example, the upper sub-structure USS may include at least one second contact CT2 and at least one second contact insulating layer IS2. In addition, although not shown in FIG. 6A, the upper sub structure USS may further include cell plugs constituting a memory block and gate lines.

The second capping layer 61 may be formed of a nitride layer. For example, the nitride layer may be a silicon nitride layer (SiN). The second insulating layer 62 may be formed of an oxide layer. For example, the oxide layer may be a silicon oxide layer ($SiO_2$). The third mask pattern 63 may include a fifth opening OP5 exposing a portion of the second insulating layer 62. The fifth opening OP5 may have a circular, elliptical, rectangular, or square layout, and be formed in the form of a hole or a trench according to a length in the Y or X direction or an aspect ratio.

Figure 6B:
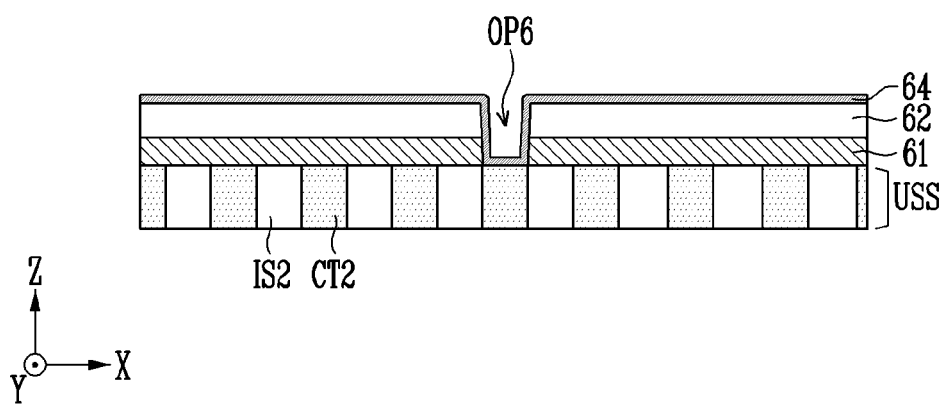

Referring to FIG. 6B, a sixth opening OP6 exposing the second contact CT2 may be formed by sequentially etching the second insulating layer 62 exposed through the fifth opening (OP5 shown in FIG. 6A) and the second capping layer 61. The sixth opening OP6 may have a circular, elliptical, rectangular, or square layout, and be formed in the form of a hole or a trench according to a length in the Y or X direction or an aspect ratio. When the sixth opening OP6 is formed, the third mask pattern (63 shown in FIG. 6A) may be removed. When the third mask pattern (63 shown in FIG. 6A) is removed, a second barrier layer 64 may be formed along a surface of the entire structure including the sixth opening OP6. The second barrier layer 64 is a layer for increasing a bonding force between a conductive layer for a second pad, which is to be formed in a subsequent process, and the layers exposed through the sixth opening OP6 and preventing diffusion, and a material of the second barrier layer 64 may be determined according to the conductive layer for the second pad.

Figure 6C:
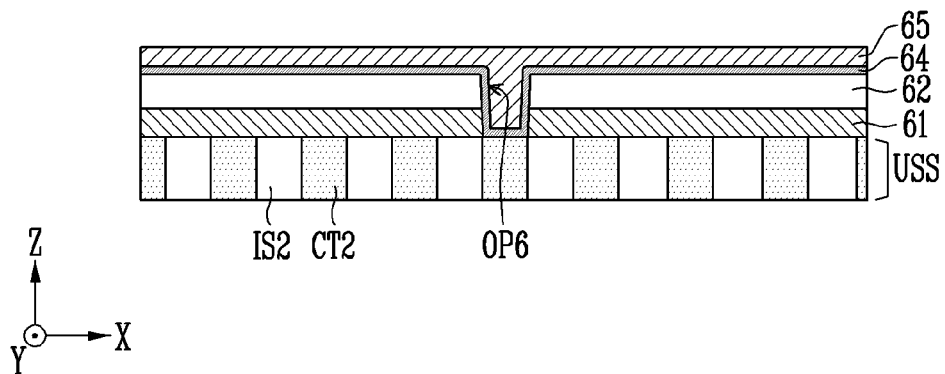

Referring to FIG. 6C, a second conductive layer 65 may be formed on the second barrier layer 64. The second conductive layer 65 may be formed such that the sixth opening OP6 is completely filled therewith. The second conductive layer 65 may be formed of copper Cu.

Figure 6D:
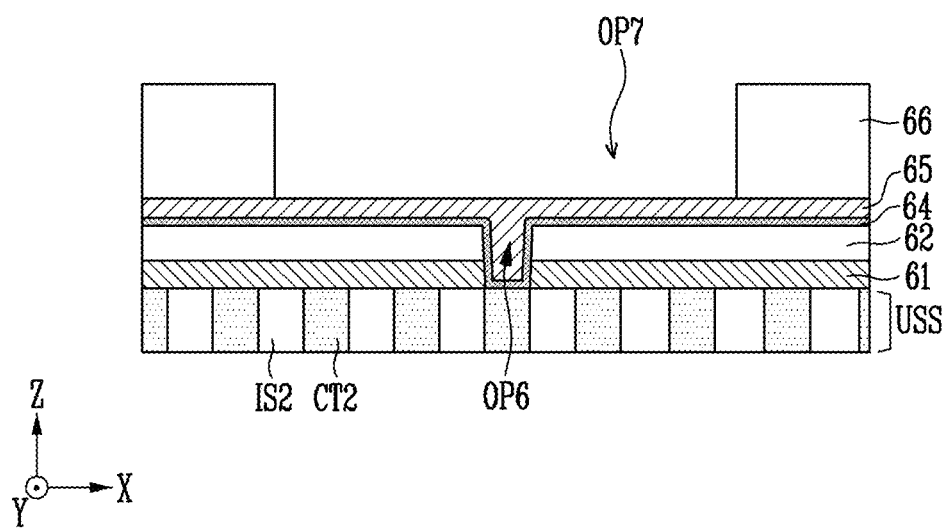

Referring to FIG. 6D, a sacrificial pattern 66 including a seventh opening OP7 may be formed on the second conductive layer 65. The seventh opening OP7 may have a circular, elliptical, rectangular, or square layout, and be formed in the form of a hole or a trench according to a length in the Y or X direction or an aspect ratio. The sacrificial pattern 66 may be formed of a material having an etch selectivity different from an etch selectivity of the second conductive layer 65. The seventh opening OP7 may be formed in a region in which the sixth opening OP6 is located, and have a width wider than a width of the sixth opening OP6.

Figure 6E:
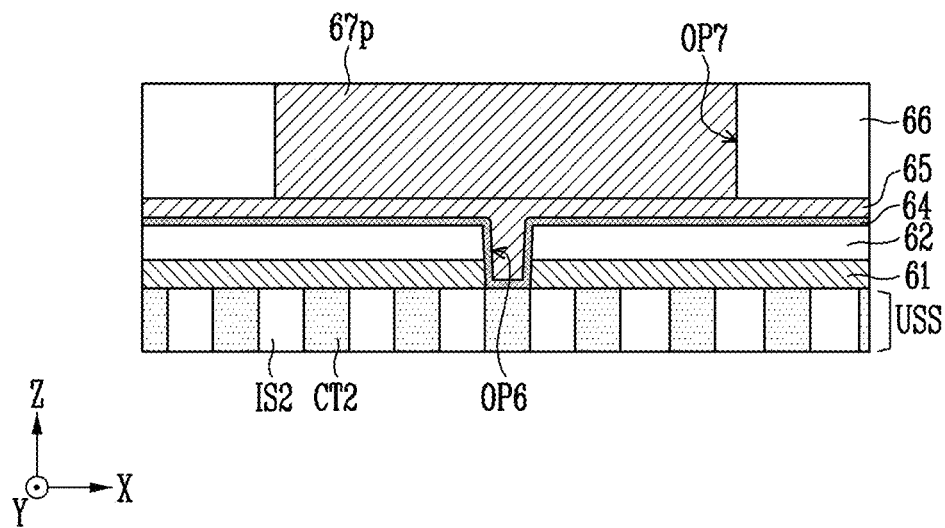

Referring to FIG. 6E, a third conductive pattern 67p may be formed in the seventh opening OP7. The third conductive pattern 67p may be formed of the same material as the second conductive layer 65.

Figure 6F:
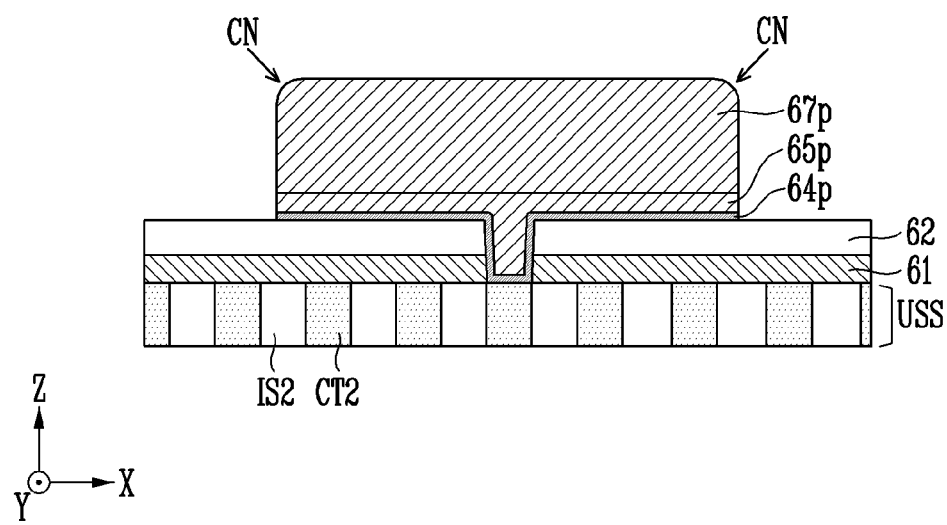

Referring to FIG. 6F, the sacrificial pattern (66 shown in FIG. 6E) may be removed, and an etching process for removing the second conductive layer (65 shown in FIG. 6E) and the second barrier layer (64 shown in FIG. 6E), which are located on the bottom of the sacrificial pattern 66 may be performed. The second conductive layer (65 shown in FIG. 6E) remaining in a lower region of the third conductive pattern 67p after the etching process may become a second conductive pattern 65p, and the second barrier layer (64 shown in FIG. 6E) remaining in the lower region of the third conductive pattern 67p after the etching process may become a second barrier pattern 64p.

Because the third conductive pattern 67p is formed of the same material as the second conductive layer 65, a portion of the third conductive pattern 67p may also be removed in an etching process of removing the second conductive layer (65 shown in FIG. 6E) after the sacrificial pattern 66 is removed. For example, in the etching process of removing the second conductive layer (65 shown in FIG. 6E), a corner portion CN of the third conductive pattern 67p may be etched further than a central flat surface of the third conductive pattern 67p. Therefore, the shape of an upper corner of the third conductive pattern 67p may be changed from a right-angled structure to a curved surface structure.

Figure 6G:
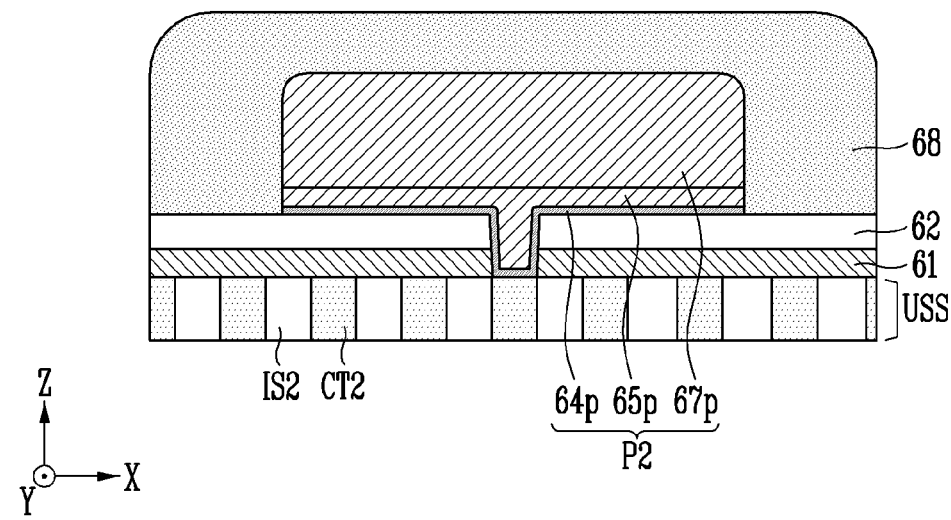

Referring to FIG. 6G, the second barrier pattern 64p, the second conductive pattern 65p, and the third conductive pattern 67p may constitute a second pad P2. Subsequently, a second blocking layer 68 may be formed on the entire structure including the second pad P2. The second blocking layer 68 may be formed of a carbon nitride layer. For example, the carbon nitride layer may be a silicon carbon nitride layer (SiCN).

Figure 6H:
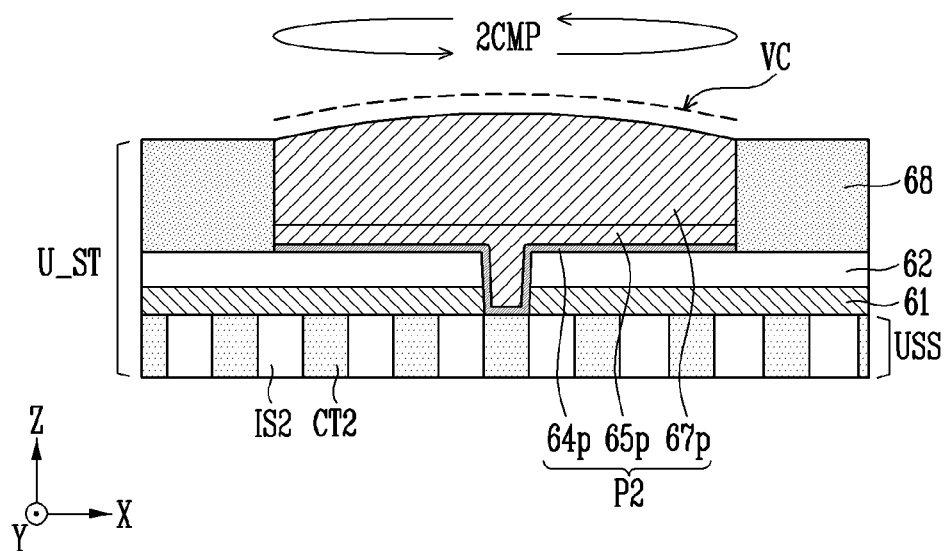

Referring to FIG. 6H, a second planarization process 2CMP may be performed until the third conductive pattern 67p of the second pad P2 is exposed. The second planarization process 2CMP may be performed identically to the second planarization process 2CMP described with reference to FIG. 4B. The second planarization process 2CMP may be performed until the third conductive pattern 67p is exposed. Because a second slurry used in the second planarization process 2CMP is made of a component using the second blocking layer 68 as a target, the second blocking layer 68 may be over-polished even when the third conductive pattern 67p is exposed. Therefore, a top surface of the third conductive pattern 67p may have a convex curved surface VC in the opposite direction from the upper sub-structure USS. Accordingly, an upper structure U_ST including the second pad P2 may be formed.

Figure 7:
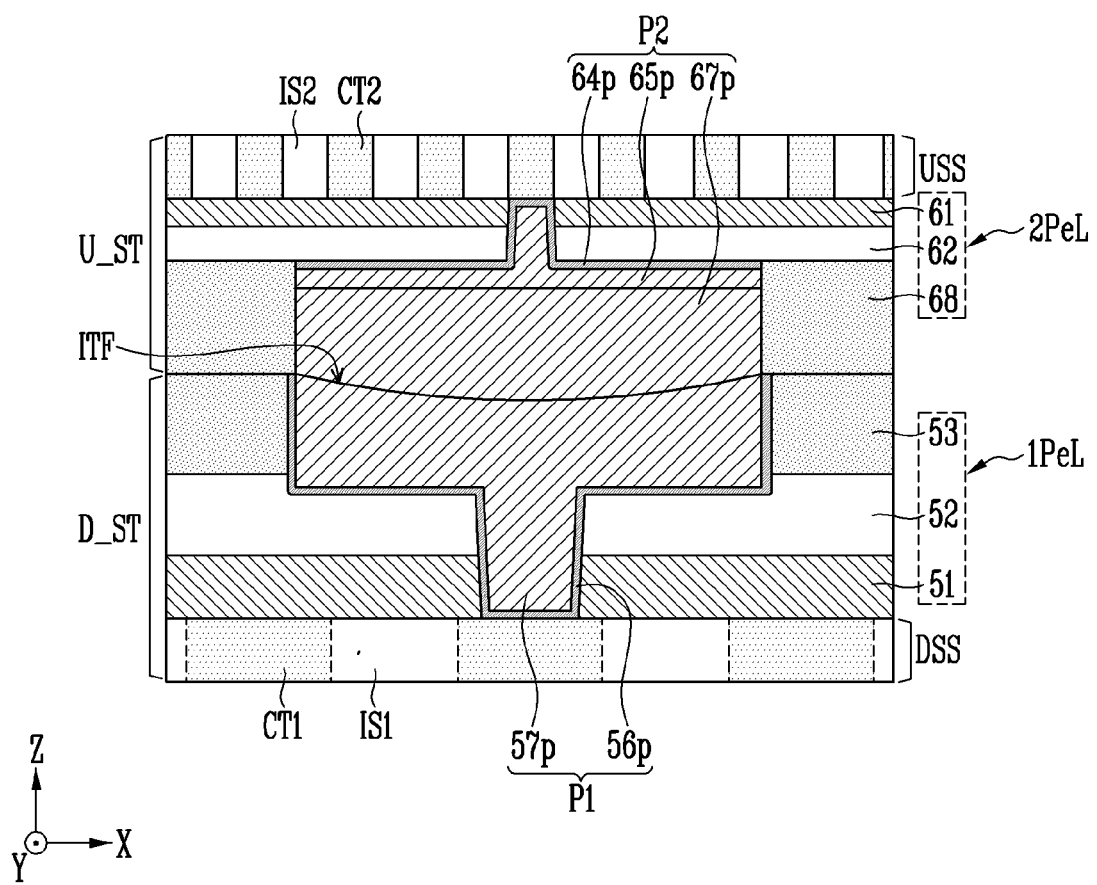
FIG. 7 is a view illustrating a bonding structure of the manufactured lower structure and the manufactured upper structure in accordance with the first embodiment of the present disclosure.

FIG. 7 is a view illustrating a bonding structure of the manufactured lower structure and the manufactured upper structure in accordance with the first embodiment of the present disclosure.

Referring to FIG. 7, the upper structure U_ST described with reference to FIG. 6H may be overturned, and the overturned upper structure U_ST may be bonded to the top of the lower structure D_ST described with reference to FIG. 5G. Therefore, the first pad P1 of the lower structure D_ST and the second pad P2 of the upper structure U_ST may be bonded to each other, and the first blocking layer 53 of the lower structure D_ST and the second blocking layer 68 of the upper structure U_ST may be bonded to each other. Because the first pad P1 has a concave curved surface and the second pad P2 has a convex surface, misalignment can be prevented when the lower structure D_ST and the upper structure U_ST are engaged with each other. For example, the convex upper second pad P2 is guided by the curvature of the lower first pad P1 to fit into the pocket formed by the concave lower first pad P1 at the correct lateral position. After the lower structure D_ST and the upper structure U_ST are bonded to each other, a heat treatment process may be further performed to increase a bonding force. When the heat treatment process is performed, a bonding force between the first blocking layer 53 and the second blocking layer 68 may be increased, and a bonding force between the first pad P1 and the second pad P2 may be also increased.

Because an interface ITF at which the first and second pads P1 and P2 are bonded to each other is a curved surface, a bonding area of the first and second pads P1 and P2 may become greater as compared with a case where the interface ITF is a flat surface. Thus, the bonding force between the first and second pads P1 and P2 can be increased. The first capping layer 51, the first insulating layer 52, and the first blocking layer 53, which are included in the lower structure D_ST, may constitute a first peripheral layer 1PeL surrounding the first pad P1, but the embodiment of the present disclosure is not limited by the first peripheral layer 1PeL. For example, the first peripheral layer 1PeL may be formed as a single layer having an insulative component. The second capping layer 61, the second insulating 62, and the second blocking layer 68, which are included in the upper structure U_ST, may constitute a second peripheral layer 2PeL surrounding the second pad P2, but the embodiment of the present disclosure is not limited by the second peripheral layer 2PeL and the upper sub-structure USS.

Figure 8:
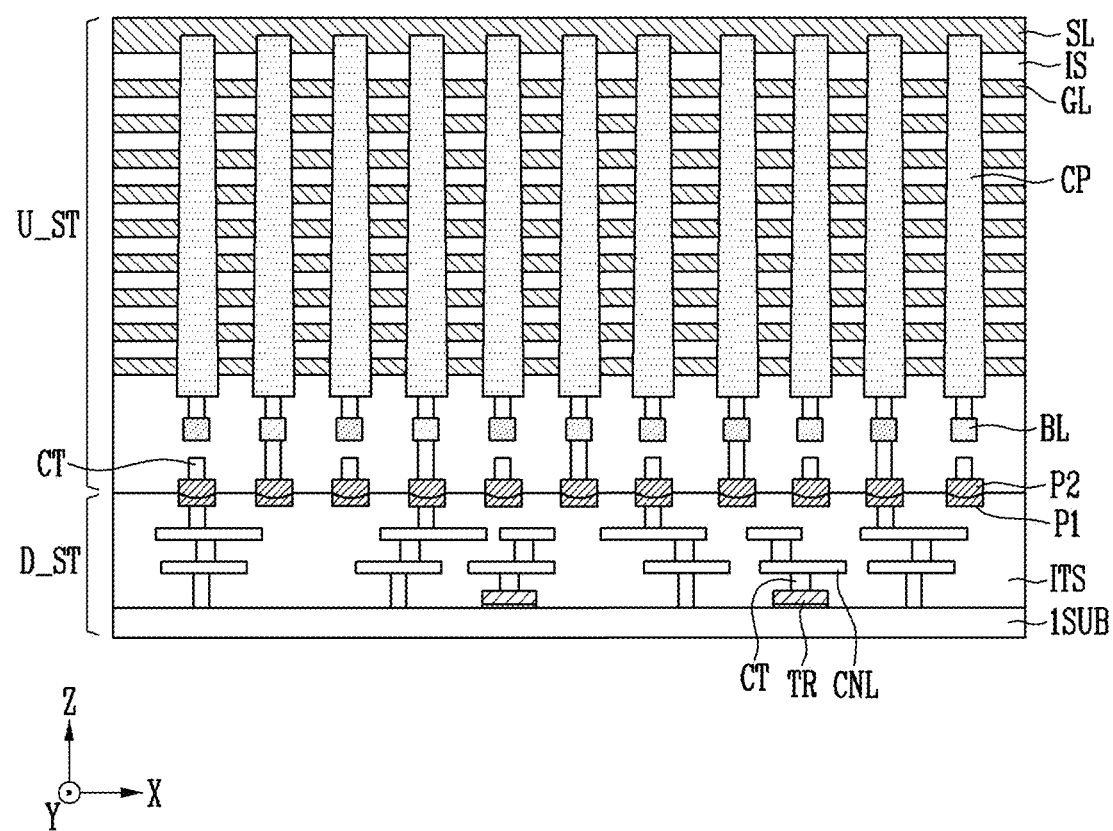
FIG. 8 is a view illustrating another embodiment of the lower structure and the upper structure.

FIG. 8 is a view illustrating another embodiment of the lower structure and the upper structure.

Referring to FIG. 8, a lower structure D_ST may include a first substrate 1SUB, transistors TR, contacts CT, connection lines CNL, an interlayer insulating layer ITS, and first pads P1. The first substrate 1SUB may be a silicon substrate, and the transistors TR, the contacts CT, and the connection lines CNL may be disposed on the first substrate 1SUB. The first pads P1 may be in contact with the tops of some of the contacts CT. The interlayer insulating layer ITS may be formed between the transistors TR, the connection lines CNL, and the first pads P1. A top surface of each of the first pad P1 may have a concave curved surface.

An upper structure U_ST may include second pads P2, contacts CT, bit lines BL, cell plugs CP, gate lines GL, insulating layers IS, and a source line SL. For example, the insulating layers IS, the gate lines GL, and the source line SL may be stacked on the interlayer insulating layer ITS of the lower structure D_ST. The cell plugs CP may penetrate the insulating layers IS, the gate lines GL, and a portion of the source line SL, and be electrically connected to the bit lines BL through the contacts CT. The second pads P2 may be bonded to the tops of the first pads P1, and the second pads P2 and the bit lines BL may be electrically connected to each other through the contacts CT. The bit lines BL and the second pads P2 may be connected to each other through the contacts CT, and be connected to each other in different areas according to a layout.

The cell plugs CP may include drain select transistors, memory cells, and source select transistors. The gate lines GL may include drain select lines connected to the drain select transistors, word lines connected to the memory cells, and source select lines connected to the source select transistors. The tops of the cell plugs CP may be in contact with the source line SL.

In the structure shown in FIG. 8, an interface at which the first and second pads P1 and P2 are bonded to each other may also form a curved surface.

Figure 9:
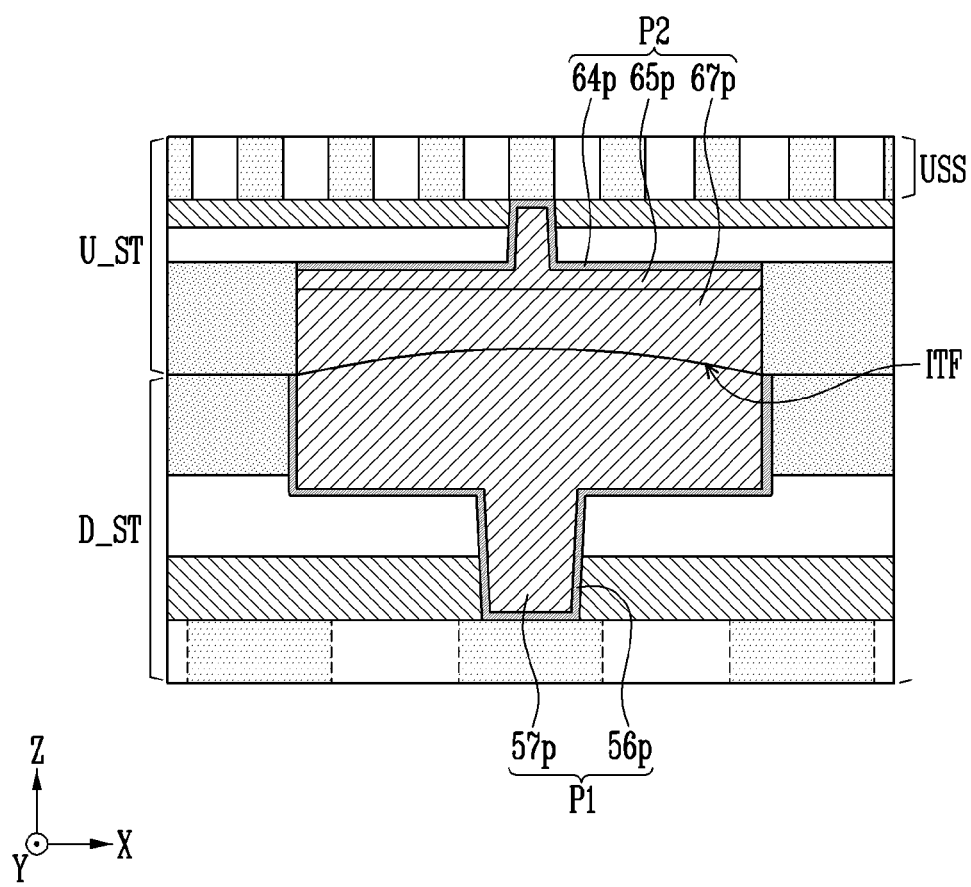
FIG. 9 is a view illustrating a memory device in accordance with a second embodiment of the present disclosure.

FIG. 9 is a view illustrating a memory device in accordance with a second embodiment of the present disclosure.

Referring to FIG. 9, in the second embodiment of the present disclosure, a first pad P1 may have a convex curved surface, and a second pad P2 may have a concave surface. For example, a planarization process in a process of forming the first pad P1 included in a lower structure D_ST may be performed as the second planarization process 2CMP described with reference to FIG. 4B. A planarization process in a process of forming the second pad P2 included in an upper structure U_ST may be performed as the first planarization process 1CMP described with reference to FIG. 4A. Therefore, a surface of the first pad P1 may form a convex curved surface in a direction toward the upper structure U_ST, and a surface of the second pad P2 may form a concave curved surface in the opposite direction from the lower structure D_ST. Accordingly, an interface at which the first and second pads P1 and P2 are bonded to each other may form a curved surface. Thus, a bonding force between the first and second pads P1 and P2 can be increased, and misalignment can be prevented.

Figure 10:
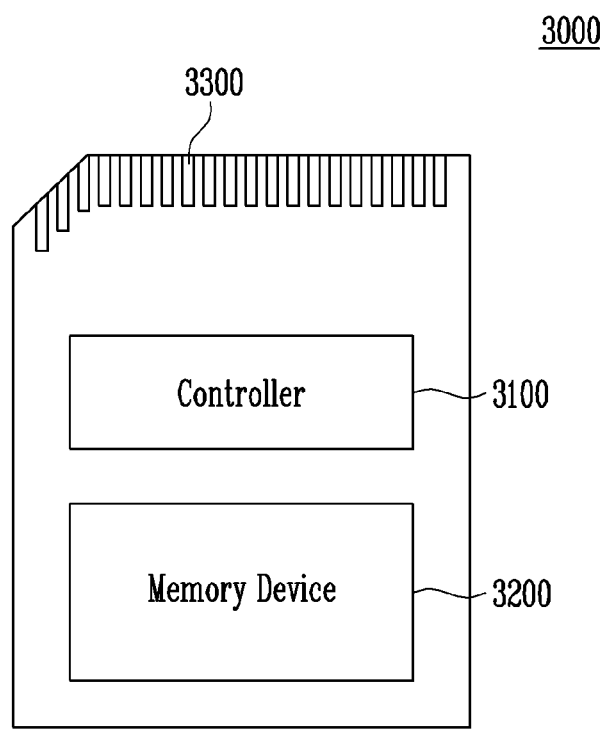
FIG. 10 is a diagram illustrating a memory card system to which the memory device of the present disclosure is applied.

FIG. 10 is a diagram illustrating a memory card system 3000 to which a memory device of the present disclosure is applied.

Referring to FIG. 10, the memory card system 3000 includes a controller 3100, a memory device 3200, and a connector 3300.

The controller 3100 may be connected to the memory device 3200. The controller 3100 may access the memory device 3200. For example, the controller 3100 may control a program, read, or ease operation, or control a background operation of the memory device 3200. The controller 3100 may provide an interface between the memory device 3200 and a host. The controller 3100 may drive firmware for controlling the memory device 3200. For example, the controller 3100 may include components such as Random-Access Memory (RAM), a processing unit, a host interface, a memory interface, and an error corrector.

The controller 3100 may communicate with an external device through the connector 3300. The controller 3100 may communicate with the external device (e.g., a host) according to a specific communication protocol. For example, the controller 3100 may communicate with the external device through at least one of various communication protocols such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe. For instance, the connector 3300 may be defined by at least one of the above-described various communication protocols.

The memory device 3200 may include memory cells and be configured identically to the memory device 100 shown in FIG. 2.

The controller 3100 and the memory device 3200 may be integrated into a single semiconductor device, to constitute a memory card. For example, the controller 3100 and the memory device 3200 may constitute a memory card such as a personal computer (PC) card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), or a Universal Flash Storage (UFS).

Figure 11:
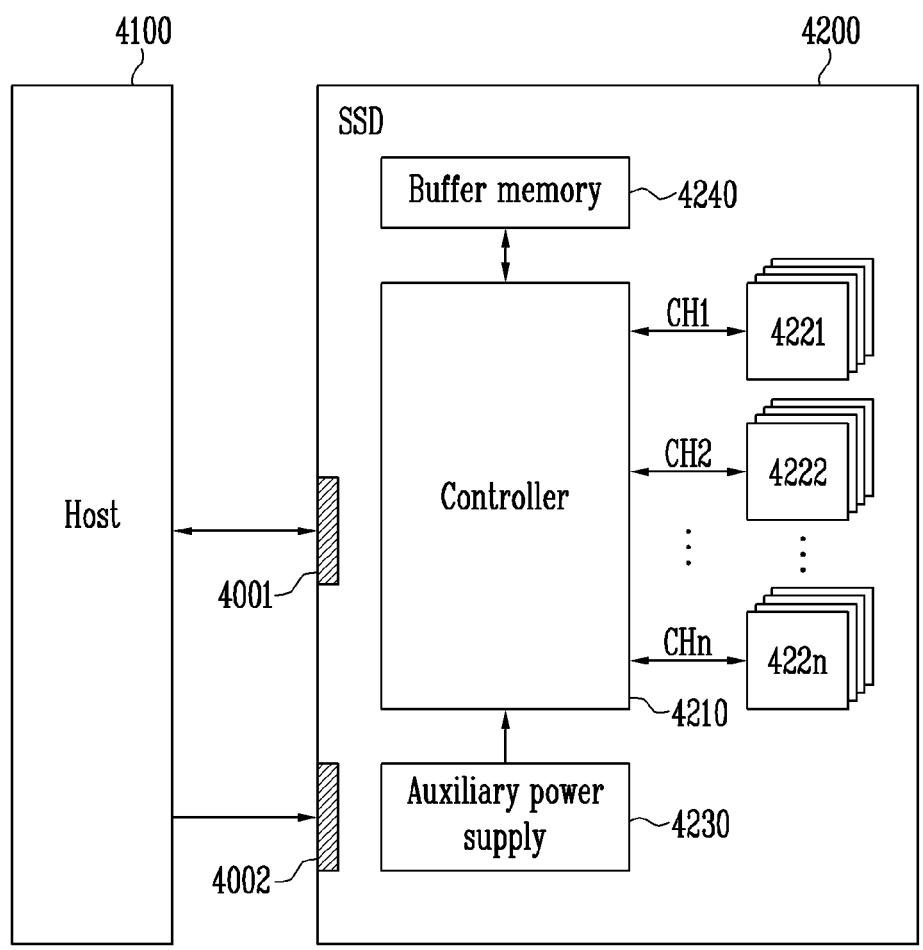
FIG. 11 is a diagram illustrating a Solid-State Drive (SSD) system to which the memory device of the present disclosure is applied.

FIG. 11 is a diagram illustrating a Solid-State Drive (SSD) system 4000 to which a memory device of the present disclosure is applied.

Referring to FIG. 11, the SSD system 4000 includes a host 4100 and an SSD 4200. The SSD 4200 exchanges signals with the host 4100 through a signal connector 4001 and receives power through a power connector 4002. The SSD 4200 includes a controller 4210, a plurality of memory devices 4221 to 422n, an auxiliary power supply 4230, and buffer memory 4240.

The controller 4210 may control the plurality of memory devices 4221 to 422n in response to a signal received from the host 4100. For example, the signal may be a signal based on an interface between the host 4100 and the SSD 4200. For example, the signal may be a signal defined by at least one of interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The plurality of memory devices 4221 to 422n may include a plurality of memory cells configured to store data. Each of the plurality of memory devices 4221 to 422n may be configured identically to the memory device 100 shown in FIG. 2. The plurality of memory devices 4221 to 422n may communicate with the controller 4210 through channels CH1 to CHn.

The auxiliary power supply 4230 may be connected to the host 4100 through the power connector 4002. The auxiliary power supply 4230 may receive power PWR input from the host 4100 and charge the power PWR. When the supply of power from the host 4100 is not smooth, the auxiliary power supply 4230 may provide power of the SSD 4200. The auxiliary power supply 4230 may be located in the SSD 4200, or it may be located outside of the SSD 4200. For example, the auxiliary power supply 4230 may be located on a main board and provide auxiliary power to the SSD 4200.

The buffer memory 4240 may operate as buffer memory of the SSD 4200. For example, the buffer memory 4240 may temporarily store data received from the host 4100 or data received from the plurality of memory devices 4221 to 422n, or temporarily store meta data (e.g., a mapping table) of the memory devices 4221 to 422*n*. The buffer memory 4240 may include volatile memory, such as DRAM, SDRAM, DDR SDRAM, LPDDR SDRAM, and GRAM or nonvolatile memory such as FRAM, ReRAM, an STT-MRAM, and PRAM.

In accordance with the present disclosure, when a lower structure and an upper structure, which are manufactured on different substrates, are bonded to each other, a bonding force between the lower structure and the upper structure can be increased, and misalignment between the lower structure and the upper structure can be prevented.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all steps may be selectively performed or some of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. A memory device comprising:
   a lower structure including a first pad exposed through a top surface of the lower structure; and
   an upper structure including a second pad exposed through a bottom surface of the upper structure,
   wherein the first and second pads are bonded to each other,
   wherein an interface at which the first and second pads are bonded to each other forms a curved surface,
   wherein the first pad comprises a first conductive pattern and a first barrier pattern,
   wherein the second pad comprises a second conductive pattern and a second barrier pattern,
   wherein the first barrier pattern covers a first side, a second side, and a third side of the first conductive pattern, and
   wherein the second barrier pattern covers only a first side of the second conductive pattern.

2. The memory device of claim 1, wherein a top surface of the first pad has a concave curved surface, and
   wherein a bottom surface of the second pad has a convex curved surface.

3. The memory device of claim 1, wherein a top surface of the first pad has a convex curved surface, and
   wherein a bottom surface of the second pad has a concave curved surface.

4. The memory device of claim 1, wherein the lower structure includes:
   a substrate; and
   a peripheral circuit located on the substrate, wherein the peripheral circuit is in contact with the first pad.

5. The memory device of claim 4, wherein the peripheral circuit includes transistors, contacts, and connection lines,
   wherein some of the contacts are in contact with the first pad and some of the connection lines, and
   wherein some of the contacts are in contact with the transistors.

6. The memory device of claim 1, wherein the upper structure includes a memory block in contact with the second pad.

7. The memory device of claim 6, wherein the memory block includes:
   a bit line located above the second pad;
   gate lines located above the bit line, the gate lines being stacked to be spaced apart from each other;
   a source line located above the gate lines; and
   a cell plug located between the source line and the bit line while penetrating the gate lines, and
   wherein the bit line is in contact with the second pad through a contact.

8. The memory device of claim 1, wherein the second pad comprises the same material as the first pad.

9. The memory device of claim 1, wherein the first and second pads comprise a conductive material.

10. The memory device of claim 1, further comprising:
    a first peripheral layer included in the lower structure, the first peripheral layer surrounding the first pad; and
    a second peripheral layer included in the upper structure, the second peripheral layer surrounding the second pad,
    wherein the first peripheral layer and the second peripheral layer are bonded to each other.

11. A method of manufacturing a memory device, the method comprising:
    forming a first peripheral layer on a first substrate;
    forming a first opening in the first peripheral layer;
    forming a first conductive pattern and a first barrier pattern for a first pad on the first opening and the first peripheral layer;
    performing a first planarization process on the first conductive layer until the first peripheral layer is exposed, using a first slurry with the first conductive layer as a target;
    forming a second conductive pattern and a second barrier pattern for a second pad on a second substrate;
    forming a second peripheral layer on the second pad and the second substrate;
    performing a second planarization process on the second peripheral layer until the second conductive pattern is exposed, using a second slurry with the second peripheral layer as a target; and
    overturning the second substrate such that the second conductive pattern is located on a bottom surface of the second substrate, and allowing the second conductive pattern to be bonded to the first conductive layer,
    wherein the first barrier pattern covers a first side, a second side, and a third side of the first conductive pattern, and
    wherein the second barrier pattern covers only a first side of the second conductive pattern.

12. The method of claim 11, wherein the first planarization process includes:
coating the first slurry on the first conductive layer; and
applying a constant pressure to the first conductive layer on which the first slurry is coated, using a rotating polishing pad.

13. The method of claim 11, wherein the second planarization process includes:
coating the second slurry on the second peripheral layer; and
applying a constant pressure to the second peripheral layer on which the second slurry is coated, using a rotating polishing pad.

14. The method of claim 11, wherein forming the second conductive pattern includes:
forming a sacrificial pattern including a second opening on the second substrate;
forming the second conductive pattern in the second opening; and
removing the sacrificial pattern.

15. The method of claim 11, further comprising forming a first barrier layer along a surface of an entire structure including the first opening before the forming of the first conductive layer for the first pad.

16. The method of claim 15, wherein, in the first planarization process, the first barrier layer formed on the first peripheral layer is removed.

17. The method of claim 11, wherein the second conductive pattern is formed of the same material as the first conductive layer.

18. The method of claim 11, wherein the first conductive layer and the second conductive pattern are formed of a conductive material.

19. The method of claim 11, further comprising stacking a second barrier pattern and a third conductive pattern for the second pad on the second substrate before the forming of the second conductive pattern.

20. The method of claim 19, wherein the third conductive pattern is formed of the same material as the second conductive pattern.

* * * * *